UNITED STATES PATENT OFFICE.

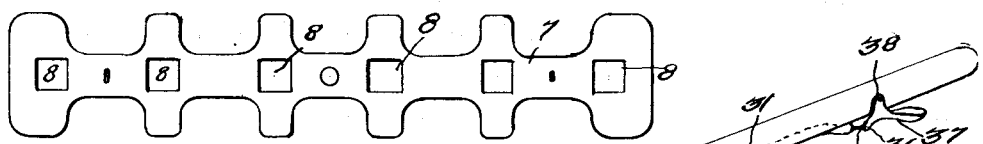
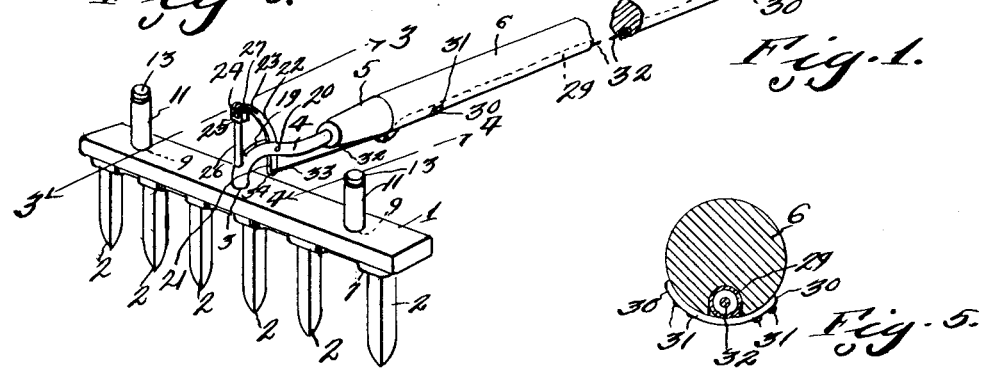
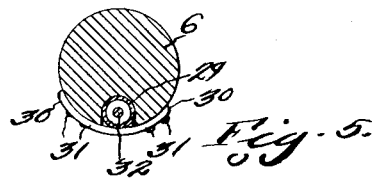
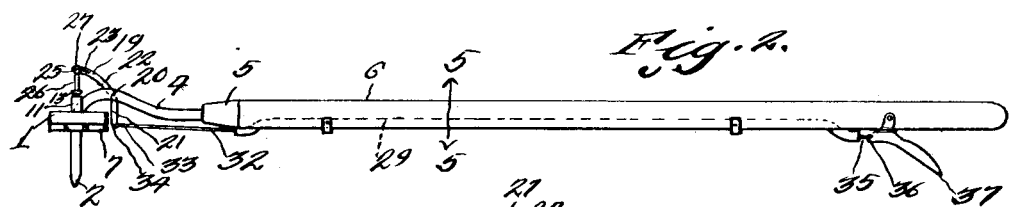
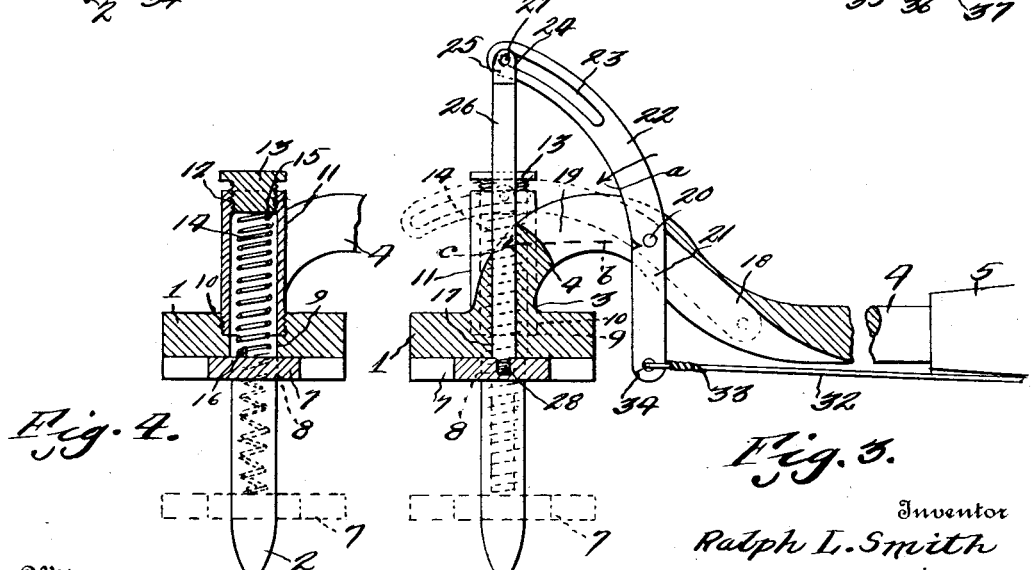
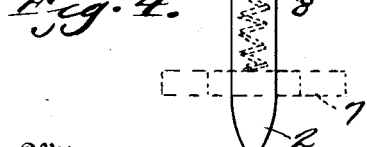

RALPH LESTER SMITH, OF GLOUCESTER, MASSACHUSETTS.

RAKE-CLEANER.

1,190,962.   Specification of Letters Patent.   Patented July 11, 1916.

Application filed December 10, 1915. Serial No. 66,117.

*To all whom it may concern:*

Be it known that I, RALPH LESTER SMITH, a citizen of the United States, residing at Gloucester, in the county of Essex, State of Massachusetts, have invented a new and useful Rake-Cleaner; and I do hereby declare the following to be a full, clear, and exact description of the invention, such as will enable others skilled in the art to which it appertains to make and use the same.

This invention relates to an improved cleaning attachment for rakes.

An object of this invention is to provide a device of this nature, in which improved features of construction are involved.

One of the features of construction is the provision of a plate having perforations through which the teeth of the rake extend, whereby the plate may be moved backward and forward, by actuating a plunger against the action of springs (which are located in casings of the rake head), through the medium of a cam slot in a lever, which in turn is oscillated by means carried upon the handle of the rake.

Another object of the invention is to provide casings for said spring means, to prevent the dust or dirt from clogging the springs, to the extent of preventing them from properly contracting.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of a rake illustrating the improved cleaning attachment as applied thereto. Fig. 2 is a view in side elevation of the rake showing the cleaning attachment applied. Fig. 3 is a sectional view transversely through the center of the rake head on line 3—3 of Fig. 1. Fig. 4 is a sectional view on line 4—4 of Fig. 1. Fig. 5 is a transverse sectional view on line 5—5 of Fig. 2 through the rake handle, showing the tube embedded longitudinally in the rake handle for the reception of the actuating rod of the oscillatory slotted lever. Fig. 6 is a plan view of the teeth cleaning plate.

Referring more especially to the drawings, 1 designates the usual form of rake head having a conventional construction of rake teeth 2. Connected to the head in any suitable manner as shown at 3 is a handle shank 4 terminating in a socket 5 for the reception of the rake handle 6.

A tooth cleaning plate, such as shown clearly in Figs. 1 and 6 is provided, and which plate 7 is provided with openings or perforations or apertures 8, corresponding in shape to and receiving the rake teeth, so that said plate in its normal position will contact flat against the under face of the rake head 1 as shown in Figs. 1 and 4 clearly. The plate 7 is provided with a plurality of laterally and oppositely extending projections or lugs, to afford a greater area, to insure the removal of the heavy brush, leaves or the like that may tend to hang to the rake head.

The rake head 1 is provided with a pair of apertures 9 having threaded counter-bores 10, into which the tubular casings 11 are threaded. The inner cylindrical surfaces of the casings 11 adjacent their upper ends are threaded at 12 for the reception of the screw threaded caps or plugs 13. To the lower end surface of each plug 13, the upper end of each of the springs 14 (which are located in the casings 11) is connected by an eye 15, while the lower end of each spring is connected by an eye 16 to the upper surface of the cleaning plate 7. The springs act to hold the cleaning plate closely in contact with the upper surface of the rake head 1, as shown in Figs. 3 and 4.

The rake head 1 has a centrally arranged opening or aperture 17, which also extends vertically through a part of the handle shank 4. The handle shank is provided with a recess 18, which is formed from the under surface of the shank, and which recess 18 merges into the slot 19 of the handle shank. Pivoted at 20 in the slot 19 adjacent where the recess 18 merges into said slot is an oscillatory lever 21, the upper curved portion 22 of which is provided with an elongated slot 23. The upper extremity of the curved portion 22 is interposed between the forks 24 of the upper bifurcated end 25 of the plunger 26, which is mounted vertically in the opening or aperture 17 of the rake head 1. A pivot bolt 27 extends transversely of the forks 24 and through one end of the slot 23 of the curved part of the lever 21. The lower extremity of the plunger 26 has a reduced threaded extension 28, which is threaded into the cleaning plate 7.

As heretofore stated the springs 14 hold the plate 7 flat against the under surface of the rake head; therefore it will be noted that when oscillating the lever 21 in the direction of the arrow a, the slot 23 of the curved portion 22 of the lever 21 will cam against the bolt 27, thereby forcing the plunger 26 downwardly through the opening or aperture 17, thereby sliding the cleaning plate 7 downwardly upon the rake teeth, so as to remove the heavy brush, leaves or the like, after which the springs 14 will return the plate 7 to its normal position in contact with the under surface of the rake head 1. The lever 21 may be oscillated as often as necessary, and in rapid succession, so as to reciprocate the cleaning plate 7 quickly, to insure the removal of the brush and the like.

As indicated by the dotted line b, it will be noted that the pivot 20 is nearer the plunger than the bolt 27 is to the end c of said dotted line, which arrangement of said pivot and the bolt 27 insures a proper camming action of the slot 23 upon said bolt, to force the plunger downwardly. As the lever 21 is operated, it will be noted that its lower end enters the recess 18 of the handle shank.

Embedded longitudinally in the under surface of the handle 6 is a tube 29, which is provided with the lugs 30 secured at 31 to said handle, so as to hold the tube embedded as shown. This tube 29 is provided for the purpose of receiving the rod 32, the end 33 of which is connected at 34 to the lower end of the lever 21, while the other end 35 of the rod is pivotally connected at 36 to the hand grip 37, which in turn is pivoted at 38 near the upper end of the handle 6. By alternately pressing and releasing the hand grip toward and from the handle 6, the rod 32 is reciprocated through the tube 29, which rod in turn will oscillate the lever upon its pivot to actuate the plunger, which in turn is returned upwardly to its normal position by the springs 14.

The invention having been set forth, what is claimed as new and useful is:

In a cleaning attachment for rakes, the combination with a handle, of a rake head having rake teeth, a cleaning plate adapted to be reciprocated on said teeth in parallelism with the teeth, said handle having an extension handle shank connected to the head, spring means against the action of which said cleaning plate is reciprocated, a plunger mounted vertically in a portion of the extension handle shank and the head and having its lower end connected to the cleaning plate, and adapted to be reciprocated vertically to actuate the plate against the tension of the spring means, and means having a camming device connected to the plunger for actuating the same, said extension handle shank having a slot, said camming device consisting of a lever pivoted in said slot and having its upper portion curved and provided with a cam slot and pin connection with the upper end of the plunger, and casings carried by the rake head for inclosing said spring means.

In testimony whereof I have signed my name to this specification in the presence of two subscribing witnesses.

RALPH LESTER SMITH.

Witnesses:
JOHN H. ERNST,
FRANK H. POMEROY.